F. L. MORSE.
ADJUSTABLE DRIVING CONNECTION FOR MOTORS.
APPLICATION FILED JAN. 13, 1915.
1,197,386.
Patented Sept. 5, 1916.
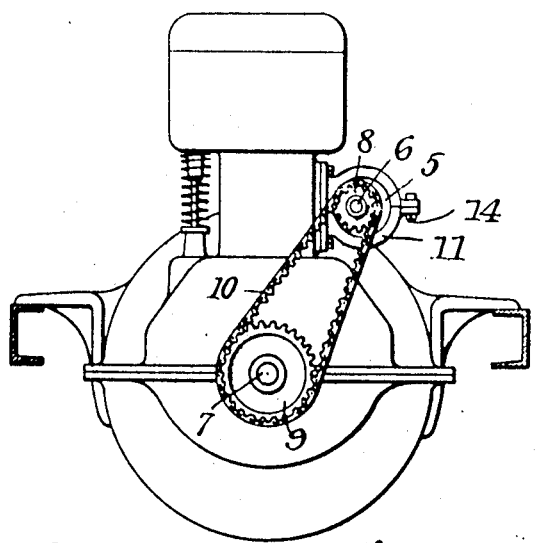
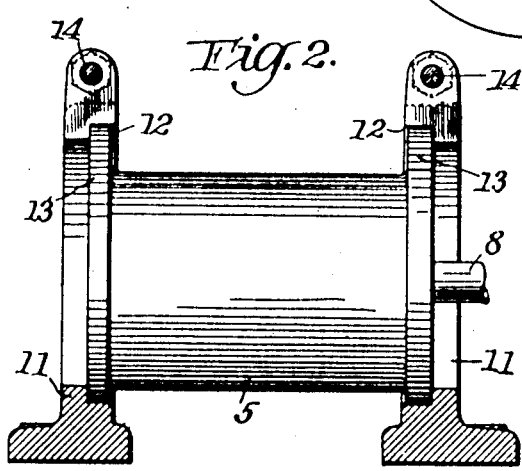
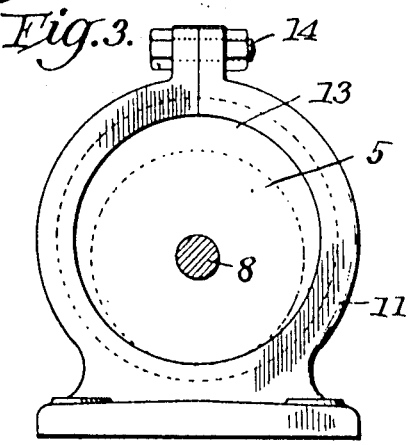
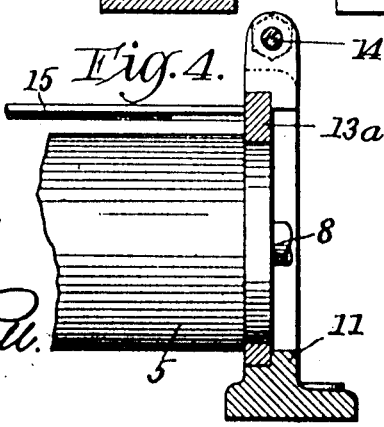
WITNESSES
INVENTOR
Frank L. Morse.
BY
Edward Wright
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

ADJUSTABLE DRIVING CONNECTION FOR MOTORS.

1,197,386.  Specification of Letters Patent.  Patented Sept. 5, 1916.

Application filed January 13, 1915. Serial No. 1,963.

*To all whom it may concern:*

Be it known that I, FRANK L. MORSE, a citizen of the United States, residing at Ithaca, in the county of Tompkins and State of New York, have invented a certain new and useful Improvement in Adjustable Driving Connections for Motors, of which improvement the following is a specification.

This invention relates to motor driving mechanism in which a motor, such as an electric motor, is employed for driving a separate machine or shaft through a driving connection between the motor shaft and the driven shaft, such connection usually consisting of intermediate gearing, pulleys and belt, or sprockets and drive chain.

In order that such driving connection may operate silently and efficiently, it is necessary that an adjustment be provided whereby the distance between the driving and driven shafts, or between the axes of the driving and driven wheels, may be changed sufficiently to take up slack and accommodate or eliminate the effect of wear, and the object of my invention is to provide an improved adjustment feature for this purpose.

With this object in view, my improvement comprises means for mounting one of the machines, such as the motor, in a bearing or bearings carried by a fixed supporting frame or frames, said bearing being eccentric to the shaft of the motor or the driving wheel, but having the axis of said eccentric bearing parallel with said shaft, whereby by turning the eccentric bearing slightly, the motor and its shaft may be shifted laterally, but always in a parallel relation and thereby adjust the driving connection.

In the accompanying drawing: Figure 1 is an end elevation of a motor driving mechanism embodying my improvement, and applied to a starting motor for an automobile engine; Fig. 2, a longitudinal section taken through the eccentric bearings, the motor casing being shown in elevation; Fig. 3, an end view of the motor casing mounted in the eccentric bearing; and, Fig. 4, a longitudinal sectional view, with one end broken away, and showing a modification.

According to the construction shown in the drawings, the motor is provided with a frame or casing, 5, and has a shaft, 6, connected by a driving connection with the driven shaft, 7, usually parallel with the driving shaft, such driving connection being here shown as comprising driving sprocket, 8, driven sprocket, 9, and drive chain, 10.

One or more fixed frames or supports, 11, are provided with cylindrical bearing surfaces, 12, eccentric to said motor shaft, and according to the preferred construction, the motor casing may have rigid flanges, 13, fitted to turn in said bearings, the axis of said bearing being parallel with that of the motor shaft. In this way the entire motor is rotatably mounted in the eccentric bearing and may be turned therein to adjust the driving connection. As herein shown, the driven shaft, 7, is the shaft of the gasolene engine of an automobile, and the fixed frame or frames, 11, may be rigidly mounted on the engine casing or other part with the axis of the eccentric bearing parallel with the driving shaft, 6, of the motor and the driven or engine shaft, 7. The fixed frame or frames, 11, are preferably split at one point, as indicated, and provided with bolts, 14, for securely clamping the eccentric bearing flanges in position after the same have been properly adjusted.

When the driving connection has become loose, due to wear, or is otherwise out of adjustment, it will be seen that the same may be readily adjusted by loosening the clamping bolts and turning the eccentric flanges slightly in their bearings thereby increasing the distance between the centers of the driving and driven shafts, but maintaining a constant parallel relation.

The slight turning of the motor casing in the eccentric bearing for producing this adjustment will not be objectionable, but if it should be preferred not to turn the motor casing, the eccentric flanges may be made separate from the motor casing, 5, in the form of eccentric rings, 13$^a$, rotatable upon the casing, and within the eccentric bearings, as indicated in Fig. 4 of the drawing. Where more than one eccentric ring is employed for supporting the motor casing, both or all of such rings may be rigidly connected, as by bars, 15, and turned together as a unit, in making the adjustment. In this modified construction the rings only will be turned in the eccentric bearings, while the casing will be shifted bodily to adjust the driving connection, as will be readily understood. While one or more fixed frames with eccentric bearing surfaces may be employed, I prefer to use two of said supports, one at each end of the motor casing.

Having now described my invention, what I claim as new and desire to secure by Letters Patent is:

1. The combination of a motor having a casing and a driving shaft, a fixed frame for supporting the motor casing, a driven shaft, driving connections between said shafts, and an eccentric bearing between the casing and said supporting frame for adjusting said driving connections.

2. The combination of a motor having a casing and a driving shaft, a fixed frame having a bearing supporting said motor casing, said bearing being eccentric to said shaft but having its axis parallel therewith, a parallel driven shaft, and a driving connection between said shafts.

3. The combination of a motor having a casing and a driving shaft, a fixed frame having a bearing eccentric to said shaft, a flange on said casing and having a bearing face fitting the bearing in said frame, a driven shaft, and a driving connection between said shafts.

4. The combination of a motor having a casing and a driving shaft, fixed frames having eccentric bearings supporting said casing at both ends, the axis of said bearings being parallel with said shaft, a driven shaft, and a driving connection between said shafts.

5. The combination of a motor having a casing and a driving shaft, a fixed frame having a bearing supporting said motor casing, said bearing being eccentric to said shaft, a driven shaft, sprockets on said shafts, and a drive chain connecting said sprockets.

6. The combination of a motor having a casing and a driving shaft, a fixed frame having a bearing supporting said motor casing, said bearing being eccentric to said shaft, said frame being split and having a clamping bolt, a driven shaft, and a driving connection between said shafts.

FRANK L. MORSE.

Witnesses:
D. B. PERRY,
C. C. NICHOLS.

Copies of this patent may be obtained for five cents each, by addressing the "Commissioner of Patents, Washington, D. C."